June 6, 1950 G. J. LEHMANN ET AL 2,510,121
PULSE MODULATION SOUND RECORDING SYSTEM
Filed April 17, 1945 2 Sheets-Sheet 1
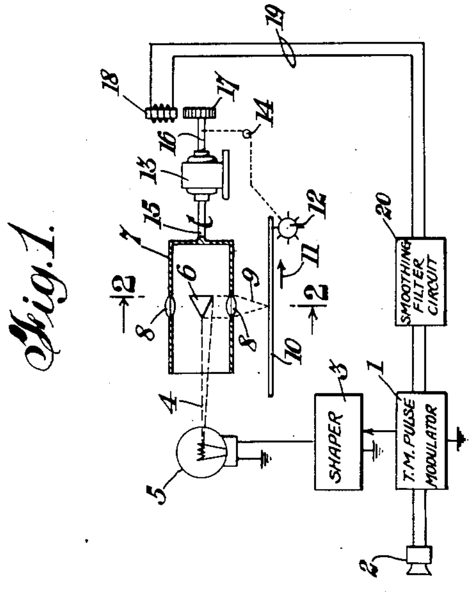
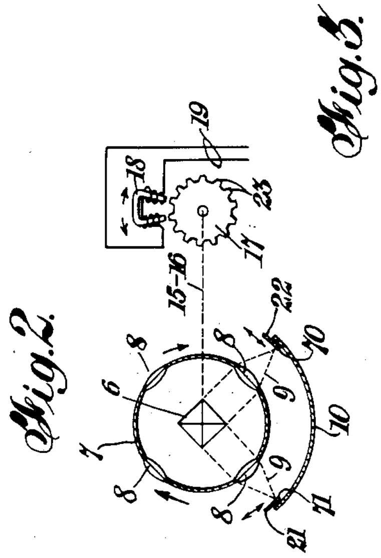
Fig. 3
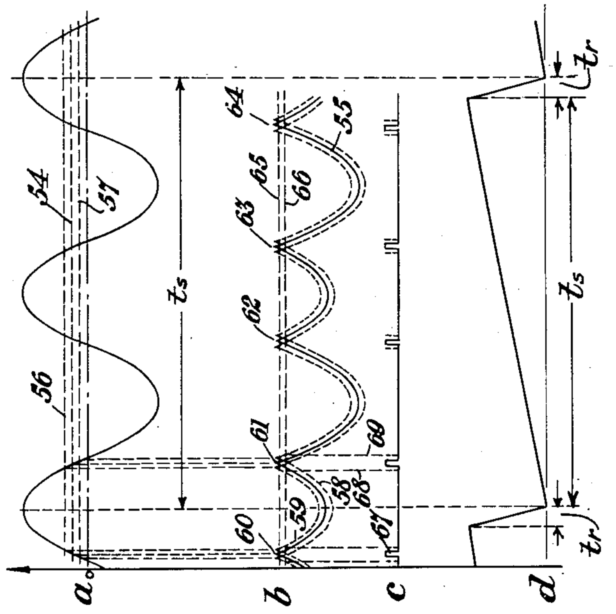
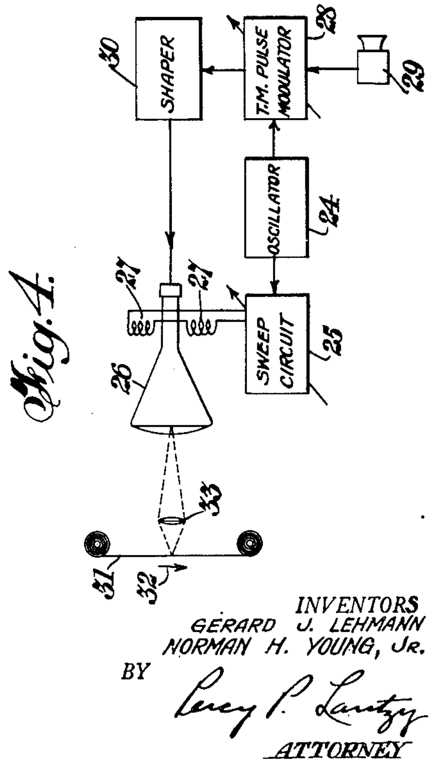
INVENTORS
GERARD J. LEHMANN
NORMAN H. YOUNG, JR.
BY
Percy P. Lantzy
ATTORNEY INVENTORS
GERARD J. LEHMANN
NORMAN H. YOUNG, JR.
BY Percy P. Lantzy
ATTORNEY Patented June 6, 1950 2,510,121

UNITED STATES PATENT OFFICE 2,510,121

PULSE MODULATION SOUND RECORDING SYSTEM

Gerard J. Lehmann, New York, and Norman H. Young, Jr., Jackson Heights, N. Y., assignors to Federal Telephone and Radio Corporation, New York, N. Y., a corporation of Delaware Application April 17, 1945, Serial No. 588,846

5 Claims. (Cl. 179—100.3)

This invention relates to methods and means for recording intelligence and more particularly to recording intelligence in the form of discrete strips or line segments.

Many methods of using the full area of photograhic film ribbons for recording intelligence have been proposed in the past. One of the outstanding methods from the viewpoint of sound recording is the proposal to scan the film in lines from side to side as the film is being steadily advanced lengthwise. This permits of a much greater linear speed of progression of the scanning spot along the track, thus allowing the recording of higher frequencies.

One fundamental drawback of this system, however, is the difficulty of removing components synchronous with the scanning rate caused by transients at the instant the end of one line is reached and the scanning of the following line is begun.

It is an object of our invention to provide a method and means which eliminates these undesirable transients as the scanner of a strip recorder leaves one discrete line and begins to scan the following line.

It is a further object of our invention to provide method and means to record intelligence having the character of a continuous function in the form of an intermittent wave or pulse form.

It is still another object of our invention to provide method and means to record intelligence in discontinuous strips or lines by means of pulses the rate of which is synchronized with the scanning in such a manner that no recording takes place at the junction point of two lines.

In accordance with one feature of our invention we first convert a continuous type of intelligence such as sound into discrete pulses which are modulated in respect to one of their characteristics in accordance with the intelligence. These modulated pulses are used as a control for the intensity of a light beam which is made to act on a photographic film. The light beam is made to scan substantially the full width of the film, as the film is being moved lengthwise, and to begin scanning the next line, as the scanning of one given line is completed, by means of a rotating scanning mechanism. The rotation of the scanning mechanism is synchronized with the generation of the pulses which are modulated by the intelligence such that no pulses occur at the junction points of any two scanning lines. The reproducer of the recorded intelligence may utilize the same type of scanner and film mechanism except that in this case the light beam may be made to vary the output of a photo-electric cell in accordance with the film record.

These and other features and objects of our invention will become more apparent upon consideration of the following detailed description to be read in connection with the accompanying drawings in which:

Fig. 1 is a schematic representation of a system for recording intelligence on a film in accordance with the invention;

Fig. 2 shows the relation of certain parts of the system of Fig. 1 in a partial section thereof along the line 2—2;

Fig. 3 is a series of graphs illustrating in part the operation of the system of Fig. 1;

Fig. 4 is an alternative recording system embodying our invention;

Figure 6:
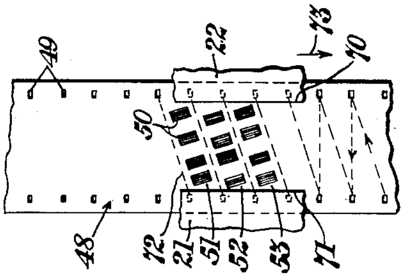
Fig. 6 is a plan view of a portion of a film bearing recorded intelligence.

Referring now to the Fig. 1, the recording system comprises a pulse generator 1 which may be of the type disclosed in Figs. 3 and 6 of the application for patent by E. Labin et al., Ser. No. 455,897, filed, August 24, 1942, now U. S. Patent No. 2,416,329, granted Feb. 25, 1947. Since this type of pulse generator has been disclosed before, no detailed description thereof will be given in this case beyond the statement that it is a so-called cusper wave generator, that is, one which converts a sine wave into a series of cusps by the rectification of one-half of the wave with respect to a non-symmetrical base or zero axis. The cusps of the resulting wave are varied in respect to their width and/or their phase in accordance with intelligence from a microphone 2 and then clipped and shaped in the form of discrete pulses at 3.

The modulated pulses are used to vary the intensities of a light beam 4 emanating from a lamp or light source 5. The light beam 4 is made to strike a mirror assembly 6 mounted in the axial center of a lense-drum 7. This drum is provided with 4 sets of lenses 8 spaced around its peripheral wall at 90° intervals. The light beam is deflected by means of the mirror assembly 6 and concentrated by means of the four lenses 8 to scan in a concentrated form 9 a film 10 being moved in a direction 11 by means of a sprocket 12, This sprocket wheel 12 may be driven by a motor 13 over a mechanical connection indicated at 14. Motor 13 may also serve as the drive for the lense-drum 7 through the medium of a shaft 15. The motor 13 carries on its free end 16, a rotor 17 for a phonic generator which includes the toothed rotor 17 and a magnet and coil aggregate 18 placed in proximity to the rotor 17. In the coils of the magnet 18 in cooperation with the magnetized teeth of the rotor 17 there is generated a sinusoidal voltage which by way of conductors 19, is applied to a smoothing filter circuit 20.

After the elimination of the undesirable harmonics at 20, the wave is applied to energize the pulse producer and modulator 1. As seen in the sectional view of the lense-drum and the film 10 the film is held in curved form across its width so as to avoid distortion of the record due to the circular movement of the scanning beam 8. The scanning width is defined by means of masks 21 and 22 disposed along the edges of the film. The position of these masks with respect to the film and the scanning beams may be adjusted by any known method.

The rotor 17 of the phonic generator is shown to be provided with suitably spaced magnetized teeth 23 and the magnet 18 to be substantially of horseshoe form, its poles being disposed immediately adjacent to the teeth 23. The position of the poles with respect to the teeth may also be adjustable in any desired manner, particularly in respect to their phase relation to the teeth.

The graph *a* of Fig. 3 indicates the type of sinusoidal voltage which may be obtained from the phonic generator 17—18.

In graph *b* there are shown the cusper wave as obtained from the sine wave at *a* from the pulse or cusper modulator 1, and there may be seen at *c*, pulses as obtained from the shaper 3 after the cusps are clipped and amplified. The significance of these graphs will be further discussed in connection with the operation of the system hereinbelow.

An alternative system for recording intelligence as shown in Fig. 4 includes an oscillator 24 which on the one hand energizes a sweep circuit 25 to produce a conventional saw-tooth sweep for the lateral displacement of an electron beam in a cathode ray tube 26 through the medium of deflection coils 27, graph *d* of Fig. 3 illustrating the type of saw-tooth sweep which may be used in this case; on the other hand, the oscillator 24 also serves to energize a pulse modulator 28 which may be of the form described in connection with the system of Fig. 1, that is, it may be of the cusper type. The pulses obtained from the cusps are modulated in time by intelligence signals from microphone 29, then shaped at 30 and then used to modulate the intensity of the beam of the cathode ray tube 26. This beam is applied through the medium of a lense 33 to a photographic film 31 which is progressively moved as indicated by the arrow 32.

Figure 5:
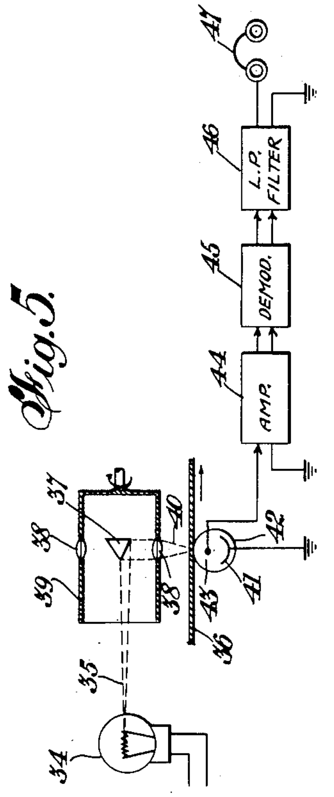
Fig. 5 is a schematic representation of a system for reproducing the intelligence recorded on a photographic film in accordance with the system of Figs. 1 and 4.

In Fig. 5 a system for reproducing the intelligence from the film as recorded by the system of Figs. 1 and 4 is shown to comprise a source of light 34 which emits a light beam 35. This light beam 35, similarly to the arrangement used in Fig. 1, is made to fall on a film 36, which is being moved longitudinally, through the medium of a deflecting mirror assembly 37 and a lense system 38 spaced as above at 90° intervals around the central wall portion of a lense-drum 39 which is rotated about its longitudinal axis. In accordance with the recorded intelligence thereon, the film 36 permits a light beam 40 with correspondingly varying intensity to act on a light-sensitive cathode 41 of a photo-electric cell 42. Voltages proportional to these varying intensities obtained from an anode 43 are then in a conventional manner applied to an amplifier 44, a demodulator 45, a low pass filter 46, and are finally utilized in an audio device such as earphones 47.

In Fig. 6, a portion of a film bearing recorded intelligence is shown comprised of a transparent photographic film 48 which has been provided with apertures 49 for cooperation with a sprocket and is shown to have a varying transparency in the form of recurrent dark pulses 50 which are spaced from one another in accordance with the original modulating intelligence. The pulses 50 are formed into discrete and separate lines or strips across the width of the film as at 51, 52, 53.

Figure 7:
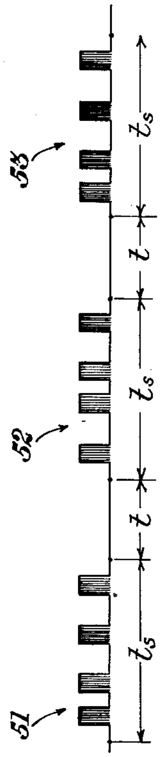
Fig. 7 shows the character of the recorded intelligence and its relationship to the scanning cycle.

In Fig. 7 the lines 51, 52, 53, are shown in sequential relationship and referred to a common horizontal base line for a better understanding of the invention.

In recording intelligence in accordance with the system of Fig. 1, the pulses which may be obtained as already indicated from the cusper type pulse generator 1 by subjecting the sinusoidal wave of Fig. 3*a* to an effective full wave rectification. As disclosed in the above-named application, Ser. No. 455,897 the rectification preferably may take place by means of a biased full wave rectifier, that is, about an offset zero axis indicated by the broken line 54. The cusper wave at 55 in Fig. 3*b* indicates the unmodulated form of a sine wave as rectified about its offset axis 54. The signal intelligence applied through the modulator 2 serves in effect to vary the sine wave of Fig. 3*a* relative to its offset axis 54 with regard to its full wave rectification. This relative variation between the wave and the zero axis thereof is illustrated in Fig. 3*a* by the upper and lower modulation limits 56 and 57. When the applied signal varies the relative relation between the offset axis 54 and the sine wave to an extent as indicated by the lower limit 57, the cusper wave 55, for example, is displaced to a position as shown by the broken line 58, and when it is varied to the displacement limit 56, the cusper wave is displaced as shown by the broken line 59. It will be observed that the signal wave thus varies the time positions of cusps 60, 61, 62, 63, 64, in push-pull toward and away from each other, thereby decreasing or increasing the time interval between successive cusps. For recording purposes the cusps are preferably clipped from the wave and shaped if desired, to form rectangular pulses, it being understood that other known shapes may be used instead. The cusps may be clipped between the limits 65 and 66 by means of a gate clipper which may form a part of the shaper 3, Fig. 1. In accordance with the circuit parameters of the gate clipper which determines the cusper wave portion between these limits, a pulse shape such as shown at 67 in Fig. 3*c* may be produced. Due to the variation of the base about which the sine wave of Fig. 3*a* may be rectified between the limits 56 and 57, the resulting pulses will vary in phase between the limits 68 and 69. A so-called time modulation of the pulses is thus obtained for a given amplitude varying intelligence.

It will, of course, be realized that the method of modulating the pulses is immaterial; thus instead of applying time modulation to the pulses as just described the pulses may be modulated in amplitude or in width, or the pulses may consist of short-bursts of a frequency modulated oscillatory energy. The pulses thus modulated are one of several possible methods serving to vary the intensity or the width or other characteristic of the light beam 4—9 impinging on the film 10. From the sectional view in Fig. 2 it is evident that due to the rotation of the lense-drum 7 the recording light beam 9 travels across the width of the film starting at the point 70 defined by the inside edge of the mask 22 to a point 71 which is determined by the inside edge of the mask 21. These scanning limits are also indicated by the lines 70 and 71 on the film portion in Fig. 6. As the light beam crosses with width of the film along the scanning lines 72 (Fig. 6), the film advances in the direction of the arrow 73. Thus, for instance, if a light beam has traveled across the width of the film and reached the line 72, a beam following it by 90° has come into place for scanning, so that, at the instant the first beam is blocked by the mask 21, another beam is appearing from behind the mask 22 to continue the scanning where the preceding beam has left off, that is, as soon as the film has advanced for the next scanning line 71 to be in position. Thus, by the proper adjustment of the masks 21 and 22 the interval $t$ (Fig. 7) between the end of the line 51 and the beginning of the next line 52 (Fig. 7) may effectively be made zero. Since the rate of occurrence of the pulses which carry the intelligence is governed by the sine wave of Fig. 3*a*, as generated by the phonic generator 17—18, and this generator is driven by the motor 13, which also determines the speed of the scanning beam 9, the scanning operation with respect to the progress of the film and the occurrence of the pulses may be synchronized such that no pulses will occur past the end or the beginning of any scanning interval $t_s$ (Fig. 7). This is brought about by a suitable adjustment of the horseshoe magnet 18 with respect to the teeth 23 so that the peaks of the sine wave produced by the generator 17—18, corresponding to the troughs of the cusper wave 55 occur substantially coincidental with the beginning or the end of the scanning intervals. This arrangement effectively prevents the recording and transmission or reproduction of any intelligence at the point of junction between scanning lines 72. For the purposes of illustration the scanning time interval $t_s$ has been shown to comprise two complete cycles of the sine wave in Fig. 3*a*.

In recording intelligence by means of the system of Fig. 4, similar considerations are applicable, except that the adjustable cathode ray sweep circuit here takes the place of the adjustable light beam masks of Fig. 2. The oscillator 24 generates the sine wave in correspondence to the phonic generator of Fig. 1, which energizes the pulse generator and modulator 28—29. The intensity of the electron beam sweeping across with width of the film 31 is modulated in accordance with the intelligence. The extent of scanning or of the sweep of the beam is regulated by suitable adjustments of the circuit 25 and the deflecting coils 27. Here, too, the extent of the sweep or scanning interval $t_s$ is maintained in the desired relationship to the pulse generating sine wave by means of the oscillator 24 which is common to the sweep and pulse circuits 24. A slight difference exists between the cathode ray recorder and the system of Fig. 1 in that the time interval $t$ in the case of the former system between the end of one scanning line and the beginning of the next is theoretically never zero as is the case in the latter system, since the return of the recording cathode ray takes a certain, if small, amount of time $t_r$ (Fig. 3*d*). As indicated at Fig. 3*d*, the saw-tooth type voltage governing the lateral sweep of the cathode ray is timed such as to return to its starting point to coincide with the selected peak of the sine wave, the occurrence of the interval $t_r$ being chosen so that no pulses will occur at that time.

It is thus evident from the above that the occurrence of transients at the instant the end of one line is reached and the scanning spot is beginning to scan the following line has been effectively eliminated.

From the foregoing description it is clear that our invention provides a superior system for audio frequencies up to 15 thousand cycles which possesses a definite improvement in its signal-to-noise ratio as compared to other sound tracks now in use, and running longer per foot of film.

It should also be noted that another application of this method is the preparation of high fidelity transcriptions for radio stations and others using sound only.

Another advantage of recording continuous wave intelligence by means of discrete pulses as proposed above, even if a synchronization of the pulse occurrence rate and of the scanning beam is not feasible, is that any transients occurring at the junction points of the strips or lines may also be removed by blocking circuits, any significant intelligence thus not being lost at that time.

While we have described above the principles of our invention in connection with specific apparatus, and particular embodiments thereof, it is to be clearly understood that this description is made by way of example only and not as a limitation on the scope of our invention as set forth in the objects and the accompanying claims.

We claim:

1. A system for recording intelligence comprising a pulse generator, a modulator for modulating pulses in accordance with said intelligence leaving a given minimum time interval between successive pulses, a recording film having means for moving it lengthwise, means for recording the intelligence in its modulated pulse form on the film in separate strips, each strip running across the width of the film within given limits, and means for synchronizing the timing of the recording of each strip with respect to the timing of the pulses so that said minimum interval between given pulses substantially corresponds with the period between the end of recording of one strip and the beginning of the recording of the next strip.

2. A system according to claim 1, wherein said film is a photographically recording film and said means for recording includes means for producing a beam of light, means for modulating said beam in accordance with said modulated pulses, means for repeatedly moving said beam across said film laterally thereof within said given limits, the lengthwise movement of the film being so related to the beam movements that successive movements of the beam across the film are separated, said synchronizing means including means timing the beam movement with respect to the pulse occurrence so that the pulse intervals substantially correspond to the hiatus between one recording movement of the beam and the next.

3. A system for recording intelligence or sound comprising means for producing recurrent discrete pulses in accordance with the intelligence or sound, means for modulating the beam of a cathode ray tube in accordance with said modulated pulses and a sweep circuit for repeatedly scanning a photographic recording film at spaced intervals across its width by the said cathode ray tube within given limits of said width and means for synchronizing the occurrence of said pulses with that of said scanning, so that intervals between given pulses substantially correspond to the hiatus between successive scannings.

4. A system for recording intelligence or sound comprising means for producing recurrent discrete pulses modulated in accordance with the intelligence, means for modulating a beam of light in accordance with said modulated pulses, a recording film having means for moving it lengthwise, means for repeatedly scanning said film across its width by said light beam at a given rate at spaced intervals and within given limits of said width, said means for scanning including an optical system for directing said light beam toward said film, means for rotating said system and means for adjustably masking said directed beam initially and finally with respect to said scanned width and means for synchronizing the occurrence of said pulses with that of said scanning so that intervals between given pulses substantially correspond to the hiatus between successive scannings.

5. A system for recording intelligence or sound comprising means for producing recurrent discrete pulses modulated in accordance with the intelligence, means for modulating a beam of light in accordance with said modulated pulses, a recording film having means for moving it lengthwise, means for repeatedly scanning said film across its width by said light beam at a given rate at spaced intervals and within given limits of said width, and means for synchronizing the occurrence of said pulses with that of said scanning so that intervals between given pulses substantially correspond to the hiatus between successive scannings, including means for rotating said means for scanning at a given rate, means for generating a sinusoidal voltage synchronous with said given rate, and means for applying said voltage for energizing said means for modulating said pulses, whereby the occurrence of said pulses is synchronized with the rate and extent of said scanning.

GERARD J. LEHMANN.
NORMAN H. YOUNG, Jr.

REFERENCES CITED

The following references are of record in the file of this patent:

UNITED STATES PATENTS

| Number | Name | Date |
|---|---|---|
| 1,862,327 | Bagno | June 7, 1932 |
| 2,146,876 | Zworykin | Feb. 14, 1939 |
| 2,281,405 | Barrish | Apr. 28, 1942 |
| 2,347,084 | Cooney | Apr. 18, 1944 |
| 2,363,502 | Collins | Nov. 28, 1944 |
| 2,416,329 | Labin | Feb. 25, 1947 |
| 2,429,613 | Deloraine et al. | Oct. 28, 1947 |

FOREIGN PATENTS

| Number | Country | Date |
|---|---|---|
| 332,615 | Great Britain | July 25, 1930 |
| 389,101 | Great Britain | Mar. 6, 1933 |